(12) United States Patent
Krenzke et al.

(10) Patent No.: US 7,112,932 B2
(45) Date of Patent: Sep. 26, 2006

(54) SYSTEM-ON-CHIP FOR HIGH VOLTAGE APPLICATIONS

(75) Inventors: Rainer Krenzke, Esslingen (DE); Eric Marschalkowski, Inning (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 144 days.

(21) Appl. No.: 10/972,517

(22) Filed: Oct. 25, 2004

(65) Prior Publication Data

US 2006/0087266 A1    Apr. 27, 2006

(30) Foreign Application Priority Data

Oct. 22, 2004    (EP) .................. 04368068

(51) Int. Cl.
*H02P 8/00*    (2006.01)
*H02P 7/06*    (2006.01)
*H03M 1/00*    (2006.01)

(52) U.S. Cl. ............... 318/254; 318/685; 318/696; 341/141; 341/142; 341/156

(58) Field of Classification Search ............ 318/245, 318/254, 560, 109, 696, 685; 180/446, 272; 713/501; 341/141
See application file for complete search history.

(56) References Cited

U.S. PATENT DOCUMENTS

| | | | | |
|---|---|---|---|---|
| 4,847,544 A | * | 7/1989 | Goldberg | 318/696 |
| 5,006,773 A | * | 4/1991 | Goldberg | 318/696 |
| 5,013,899 A | | 5/1991 | Collins, Jr. | 235/462 |
| 5,299,648 A | * | 4/1994 | Watanabe et al. | 180/446 |
| 5,455,937 A | * | 10/1995 | Berman et al. | 703/23 |
| 5,504,903 A | * | 4/1996 | Chen et al. | 713/1 |
| 5,736,948 A | * | 4/1998 | Mitsuishi et al. | 341/141 |
| 5,764,007 A | * | 6/1998 | Jones | 318/109 |
| 5,764,024 A | * | 6/1998 | Wilson | 318/805 |
| 6,182,235 B1 | * | 1/2001 | Ma et al. | 713/501 |
| 6,194,856 B1 | | 2/2001 | Kobayashi et al. | 318/432 |
| 6,215,261 B1 | | 4/2001 | Becerra | 318/254 |
| 6,680,590 B1 | | 1/2004 | Inoue et al. | 318/114 |
| 6,731,089 B1 | * | 5/2004 | Cho et al. | 318/560 |

(Continued)

FOREIGN PATENT DOCUMENTS

EP    0 572149 A    12/1993

(Continued)

OTHER PUBLICATIONS

Co-pending U.S. Patent App. DS-02-021, Ser. No. 10/615,123, filed Jul. 08, 2003, "Slew Rate Sensing and Control of a High-Voltage Output Driver for a Variable Voltage Range and Variable Outputload".

(Continued)

*Primary Examiner*—Paul Ip
(74) *Attorney, Agent, or Firm*—Saile Ackerman LLC; Stephen B. Ackerman

(57) ABSTRACT

A system-on-a-chip (SOC) in CMOS technology capable to support high voltage applications has been achieved. The single chip system of the present invention comprises high-voltage circuitry, a complete micro-controller system including all timing control, interrupt logic, flash EEPROM program memory, RAM, flash EEPROM data memory and I/O necessary to implement dedicated control functions, and a core and system peripheral bus. A preferred embodiment of the invention is shown driving a DC-motor in a H-bridge configuration, having an AMR-position detection and control. A pulse width modulation (PWM) is applied to high-voltage (30 to 60 Volts or in lower ranges less than 30 Volts) CMOS buffers for steering CMOS-FETs or relays of the motor H-bridge.

41 Claims, 2 Drawing Sheets

U.S. PATENT DOCUMENTS

| | | | |
|---|---|---|---|
| 2004/0189221 A1* | 9/2004 | Kurosawa et al. | 318/254 |
| 2005/0067210 A1* | 3/2005 | Hayashi | 180/272 |
| 2005/0093501 A1* | 5/2005 | Takahashi et al. | 318/568.13 |
| 2005/0205344 A1* | 9/2005 | Uryu | 180/446 |

FOREIGN PATENT DOCUMENTS

| | | | |
|---|---|---|---|
| GB | 2 276050 A | 9/1994 | |

OTHER PUBLICATIONS

Co-pending U.S. Patent App. DS-02-026, Ser. No. 10/613,600, filed Jul. 3, 2003, "32V H-Bridge Driver with CMOS Circuits".

Co-pending U.S. Patent App. DS-02-027, Ser. No. 10/420,592, filed Apr. 22, 2003, "Magnetic Sensor Digital Processing Interface for Electrical Motor Application".

* cited by examiner

SYSTEM-ON-CHIP FOR HIGH VOLTAGE APPLICATIONS

RELATED PATENT APPLICATIONS

This application is related to U.S. patent application U.S. Ser. No. 10/615,123 filed Jul. 8, 2003, to U.S. patent application U.S. Ser. No. 10/613,600 filed Jul. 3, 2003, and to U.S. patent application U.S. Ser. No. 10/420,592 filed Apr. 22, 2003. All these patent applications are assigned to the same assignee as the present invention.

BACKGROUND OF THE INVENTION (1) Field of the Invention

This invention relates generally to a single chip driver system and relates more particularly to a single CMOS chip system capable to handle high-voltages for e.g. motor drivers in automotive applications.

(2) Description of the Prior Art

In many applications, e.g. in automotive applications, high voltage (HV) is required for a more effective operation. High voltage (HV) in this context means voltage levels up to 40 Volts. In the past very thick gate oxides were used, e.g. up to 80 nm SiO2 would be needed to handle up to 40 Volts. This caused big manufacturing problems to make these thick gate oxides stable with a good quality. In any case it is a very costly solution and doesn't really fit for ASICs requiring system solutions on a single chip. This is especially important because standard voltages used in today's applications may vary from about 1.3V to more than 100V, depending on the specific application.

In standard CMOS technologies high voltage (HV) is defined as any voltage higher than the nominal (low) voltage, i.e. 5V, 3.3V, or even lower. In the standard CMOS environment, IC designers are more and more frequently confronted with HV problems, particularly at the I/O level of the circuit.

A large range of industrial or consumer circuits either require HV driving capabilities, or are supposed to work in a high-voltage environment. This includes ultrasonic drivers, flat panel displays, robotics, automotive, etc. On the other hand, in the emerging field of integrated microsystems, MEMS actuators mainly make use of electrostatic forces involving HV voltages having an upper range of 30 to 60 Volts while a lower range is in the order of magnitude of less than 30 Volts. Last but not least, with the advent of deep sub-micron and/or low-power technologies, the operating voltage tends towards levels ranging from 1V to 2.5V, while the interface needs to be compatible with higher voltages, such as 5V.

For all these categories of applications, it is usually preferable to perform most of the signal processing at low voltage, while the resulting output requires a higher voltage level. Solving this problem requires some special actions at three levels: technology, circuit design and layout.

Electrical motor drivers are typical applications of single chip systems. There are various patents available to drive electrical motors from a single chip. Until now the upper limit of the voltage level is still too low for many applications as e.g. in the automotive sector.

U.S. Pat. No. 6,680,590 to Inoue et al. describes a vibration motor obtaining a FAST signal when r.p.m. of the motor is faster than reference speed, whereby an output-driving circuit is controlled by the FAST signal to omit parts of the powering periods of respective phases. The motor thus controls the r.p.m. and increases torque ripple generated from the motor. As a result, vibration magnitude increases and insufficient vibration due to downsizing of the motor can be compensated by the control system. A motor driver can be formed with a one chip semiconductor device, so that the number of exterior components is reduced and the motor can be downsized and have light weight.

U.S. Pat. No. 5,013,899 to Collins. discloses a microprocessor-controlled scanning system having a scanning element, which is driven by a three-phase DC motor having a low quiescent current motor driver circuitry. A bus driver chip normally used to drive a computer memory bus is novelly used in place of a prior art triple half-bridge circuit to source and sink the drive windings of the motor, thus significantly reducing the drive circuitry power requirement

SUMMARY OF THE INVENTION

A principal objective of the present invention is to achieve a CMOS single chip system capable to drive high-voltage applications.

A further objective of the present invention is to achieve a CMOS single chip system capable to drive a DC motor in a H-bridge configuration requiring high voltages in the order of magnitude of 30 to 60 Volts or in lower ranges less than 30 Volts.

In accordance with the objects of this invention a system on a chip using CMOS technology being able to drive devices requiring high voltage has been achieved. The system invented comprises, first, a means of data processing, a means of memory, attached to said means of data processing, several output ports, attached to said means of data processing and to means of power management, and several input ports attached to a circuitry to manage feedback. Furthermore the system invented comprises means of clock sources attached to said means of data processing, a core and peripheral bus coupled to said means of data processing, to a circuitry to drive devices and to a circuitry to manage feedback, said means of power management, said circuitry to drive devices requiring high voltage, and said circuitry to manage feedback from said devices to be driven by the system.

In accordance with a further object of this invention a system on a chip using CMOS technology being able to drive a DC-motor in a H-bridge configuration requiring high voltage support has been achieved. Said system comprises, first, a means of data processing, a means of memory, attached to said means of data processing, several output ports, attached to said means of data processing and to a means of power management, and several input ports attached externally to an AMR sensor and attached internally to an AMR sensor interface. Furthermore the system comprises means of clock sources coupled to said means of data processing, a core and peripheral bus coupled to said means of data processing, to a motor bridge controller, and to an AMR sensor controller, and said means of power management. In order to drive the DC-motor the system comprises a motor bridge controller being coupled between said means of data processing and ports of the ASIC to be connected to high side and low-side transistors of the H-bridge comprising a circuitry to generate PWM und timing pulses, high-side drivers providing high voltage, and low-side drivers providing high voltage. In order to control the speed and the direction of the rotation of the DC-motor the system comprises furthermore an AMR sensor controller, being coupled to said means of data processing and to an AMR sensor comprising an analog-to digital converter and an angle measurement interface. Furthermore the system comprises said AMR sensor attached to the DC-motor, said DC-motor, driven by two high-side and two low-side transistors, said two high-side transistors of the H-bridge, being connected to said high-side drivers of said motor bridge controller and to a means to prevent reverse supply, said two low-side transistors of the H-bridge, being connected to said low-side drivers of said motor bridge controller, and said means of reverse supply protection being coupled between said high-side transistors and said means of power management.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose a novel system on a single chip including data processing means and high-voltage circuitry capable to drive devices as e.g. electrical motors requiring voltages having an upper range of high voltages (HV) between 30 to 60 Volts, while a lower range is having less than 30 Volts. New semiconductor manufacturing processes using extended drains and about 20 nm SiO2 enable a cost-effective manufacturing of semiconductors being capable to drive such high voltages (HV).

The control of an electrical DC motor in a H-bridge configuration is disclosed as an example of an embodiment of the present invention. There is a multitude of different applications possible for single chip ASICs of the present invention. Examples of possible applications requiring high voltage driving capabilities are automotive and aircraft applications, integrated Microsystems (MEMS), flat panel displays, robotics and especially driving electrical motors, etc.

Figure 1:
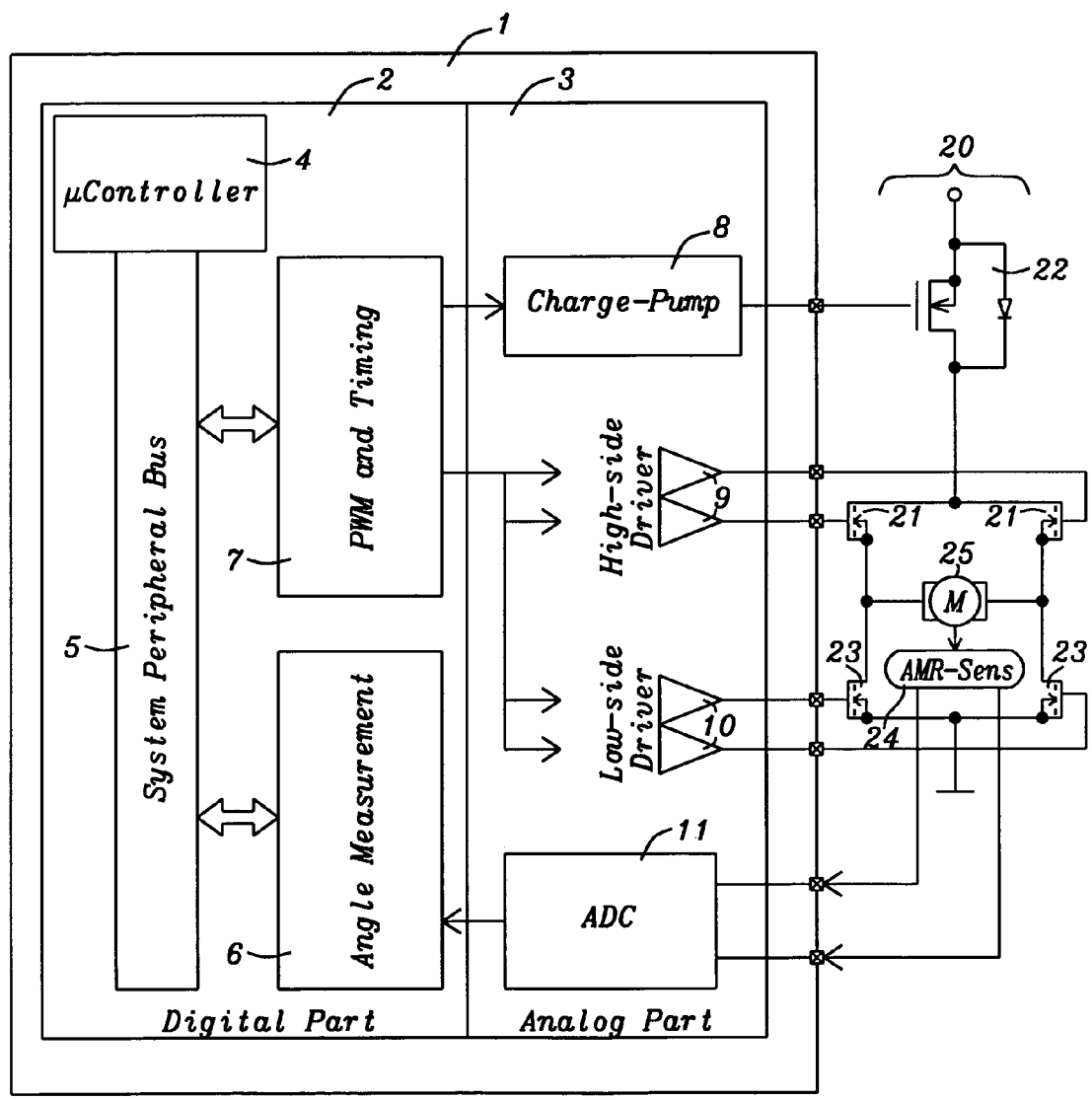
FIG. 1 illustrates a basic system overview of an application of a preferred embodiment.

FIG. 1 shows as a non-limiting example a preferred embodiment of the invention. The main application area of the system-on-chip (SOC) shown in FIG. 1 is the control of a DC-motor with position detection. The preferred embodiment of the present invention comprises an external motor H-bridge 20 and an ASIC 1 having a digital part 2 and an analog part 3. The ASIC 1 has been implemented using a 0.35 μm high voltage CMOS process using normal field and gate oxide thickness and extended drains being capable to handle an upper range of high voltages (HV) between 30 to 60 Volts, while a lower range is having less than 30 Volts. Alternatively a 0.25 μm or 0.18 μm or in the future even smaller CMOS processes could have been used as well.

The digital part 2 comprises a micro-controller unit 4, a system peripheral bus 5, an angle measurement interface 6, and a PWM and timing block 7 of the motor bridge controller. The micro-controller system 4 comprises all timing control, flash EEPROM program memory, RAM, Flash EEPROM data memory and I/O necessary to implement dedicated control functions. In the preferred embodiment any type of micro-controller plus RAM, program flash and data flash memories can be used.

The analog part 3 comprises a charge pump 8, high side drivers 9 for a H-bridge, low-side drivers 10 for the H-bridge, and an analog-to-digital converter (ADC) 11. In the preferred embodiment a high-resolution 2-channel ΔΣ ADC has been implemented.

The high-side drivers 9, the low-side drivers 10, the charge pump 9, and the motor bridge controller 7 can control e.g. an H-bridge motor drive 20 driving DC-motor 25 as described in the U.S. patent application U.S. Ser. No. 10/613,600 filed Jul. 7,2003. This H-bridge motor drive 20 is a non-limiting example of an application driven by the ASIC 1. The output voltage from said charge pump 8 is driving a reverse supply protection module 22 and both high-side transistors 21 of said H-bridge. The low-side drivers 9 drive both low-side transistors 23. The analog-to-digital converter 11 can be used e.g. together with the angle measurement interface 6 to provide a constant feedback of the angular position of a DC-motor measured by the anisotropic magneto resistive (AMR) sensor 24 as described in the U.S. patent application Ser. No. 10/420,592 filed Apr. 22, 2003. This feedback is used by the motor bridge controller to control the direction and the speed of the DC-motor. The combination of the ADC converter 11, converting the analog output of the AMR sensor 24, and the angle measurement interface 6 can be used for any kind of magnetic sensors providing analog signals of the sine and cosine values of the angle to be determined. Said analog signals are being processed in two measurement paths for the sine and cosine signal each until the desired angle is computed by a CORDIC processor as part of the angle measurement interface 6. The first stage of said measurement path is the conversion of the sine and cosine signals from analog to digital by $2^{nd}$ order delta-sigma modulators in the ADC interface 11 with an over-sampling ratio. A low-pass decimation filter with $sinc^3$ characteristic performs the digital value computation.

A pulse-width modulation is applied by the motor bridge control 7 controlling the high-voltage high-side and low-side drivers. Important control signals provided by said motor bridge control 7 are PWM pulses to define the speed of the motor and to define the direction of the rotation of the motor.

The timing of said PWM pulses preventing any "non-overlapping" is performed by a digital finite state machine (FSM) as part of said digital interface 22.

It has to be understood that many different types of DC-motors could by driven by the system invented. Furthermore relays could be used instead of the four power FETs used as high-side transistors 21 and low low-side transistors 23. drivers From an application point of view the PWM and Timing block 7, the charge pump 8, the high side driver 9 and the low side driver 10 are part of a high voltage device controller or in other words, in case of the preferred embodiment shown, part of a Motor Bridge Controller. The analog-to-digital converter 11 and the angle measurement block 6 are part of a feedback mechanism required for the control, in case of the preferred embodiment, of a DC motor. In case of other applications than the control of a DC-motor these two main blocks, high voltage device controller and feedback mechanism could be implemented as well, only having a different purpose.

Figure 2:
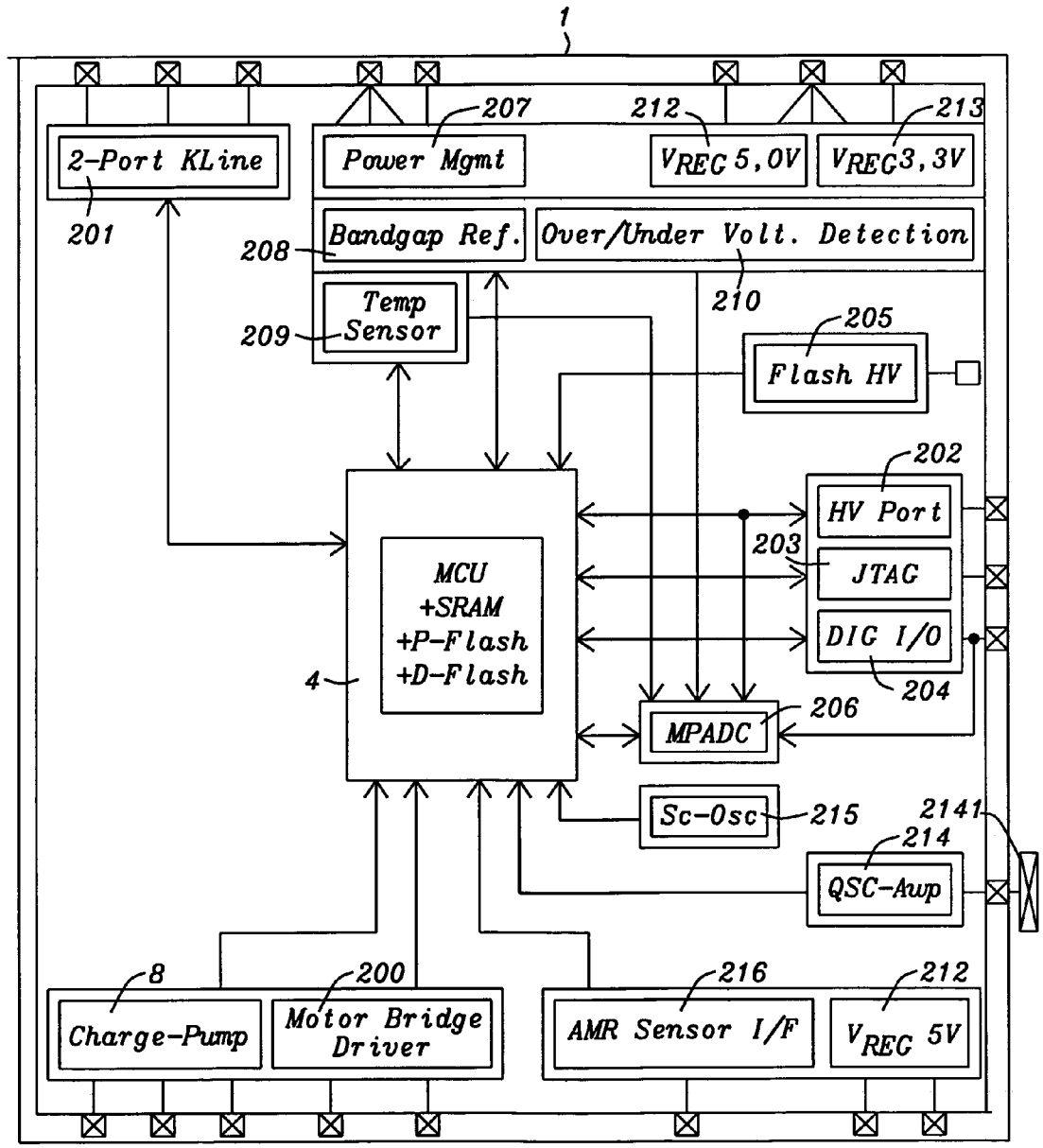
FIG. 2 shows an ASIC block diagram with different voltage domains

FIG. 2 shows a principal block diagram of a preferred embodiment of an ASIC 1 of the present invention. The micro-controller unit (MCU) 4, used in the preferred embodiment is a 16-bit μ-controller plus RAM, program flash memory and a data flash-memory.

The ASIC 1 comprises a power management block 207, a band-gap reference block 208, a over/under-voltage and short-circuit detection block 210, a regulated 5.0 V block 212 for standard I/O domain supply, a regulated 5.0 voltage block 213 for core domain supply, and a temperature sensor block 209.

Furthermore the system can operate from an oscillator amplifier 214 in the MHz range having either an external crystal 2141 or alternatively an external ceramic resonator. Additionally the system can work from an internal slow clock oscillator 215 for standby or sleep mode operation. Said internal slow clock oscillator 215 could be either a ring oscillator or a relaxation oscillator.

Furthermore the ASIC 1 of FIG. 2 comprises a charge pump 8 and the motor bridge driver 200 comprising the high side drivers and the low side drivers shown in FIG. 1 and an AMR sensor interface 216. The ASIC furthermore comprises a 2-port KLine connection 201 to communicate with other chips or systems, a Flash HV block 205 to provide wafer level test, a high voltage port block 202 supporting four high voltage ports, a Multi-Purpose analog-to-digital converter (MPADC) 206, and a digital I/O block 204 supporting eight digital I/O ports.

Said MPADC converter monitors internal conditions as e.g. temperature and battery supply level and can be switched to I/O ports to measure external signals as e.g. user specific functions.

The Joint Test Action Group (JTAG), or "IEEE Standard 1149.1" standard specifies how to control and monitor the pins of compliant devices on a printed circuit board. The protocol also allows the testing of equipment, connected to the JTAG port block 203, to identify components on the board (by reading the device identification register) and to control and monitor the device's outputs.

The components of ASIC 1 support three different voltage levels, namely 3.3 Volts, 5 Volts, and high voltage level having an upper range between 30 to 60 Volts. The microcontroller unit (MCU) 4, the temperature sensor 209, the band-gap reference 208, the 3.3 V regulated voltage block 213, the slow clock oscillator 215, and the crystal-oscillator 214 belong to the 3.3 Volts domain.

The 5.0 V regulated voltage block 212, the over/under voltage and short-detection unit 210, the JTAG port block 203, the digital I/O block 204, the MPADC block 206, and the AMR Sensor Interface 216 are part of the 5.0 Volts domain.

The 2-port KLine block 201, the power management module 207, the Flash HV block 205, the HV-port 202, the charge pump 8, and the motor bridge driver 200 are part of the high-voltage (HV) domain.

It has to be understood that the preferred embodiment shown is a non-limiting example of the present invention only. It is furthermore obvious that improvements of semiconductor manufacturing processes to be expected soon the upper voltage limit of 30 to 60 Volts of the preferred embodiment can be further increased.

While the invention has been particularly shown and described with reference to the preferred embodiments thereof, it will be understood by those skilled in the art that various changes in form and details may be made without departing from the spirit and scope of the invention.

What is claimed is:

1. A system on a chip using CMOS technology being able to drive devices requiring high voltage is comprising:
    a means of data processing;
    a means of memory, attached to said means of data processing;
    several output ports, attached to said means of data processing and to means of power management;
    several input ports attached to a circuitry to manage feedback;
    means of clock sources attached to said means of data processing;
    a core and peripheral bus coupled to said means of data processing, to a circuitry to drive devices and to a circuitry to manage feedback;
    said means of power management;
    said circuitry to drive devices requiring high voltage; and
    said circuitry to manage feedback from said devices to be driven by the system.

2. The system of claim 1 wherein said means of data processing is a microcontroller.

3. The system of claim 1 wherein said high voltage has an upper range between 30 to 60 Volts.

4. The system of claim 1 wherein said means of memory comprises a RAM.

5. The system of claim 1 wherein said means of memory comprises a Program Flash memory.

6. The system of claim 1 wherein said means of memory comprises a Data Flash memory.

7. The system of claim 1 wherein said means of power management comprises one or more charge pumps.

8. The system of claim 1 wherein said output ports comprise ports having a regulated voltage.

9. The system of claim 1 wherein said output ports provide different voltage levels having an upper range between 30 to 60 Volts.

10. The system of claim 1 wherein said means of clock sources comprise an oscillator amplifier having an external crystal.

11. The system of claim 1 wherein said means of clock sources comprise an oscillator amplifier having an external ceramic resonator.

12. The system of claim 1 wherein said means of clock sources comprise an internal slow clock oscillator.

13. The system of claim 12 wherein said internal oscillator is a relaxation oscillator.

14. The system of claim 12 wherein said internal oscillator is a ring oscillator.

15. The system of claim 12 wherein said internal oscillator operates with 100 kHz. The system of claim 1 wherein said system is comprising a temperature sensor.

16. The system of claim 1 wherein said device requiring high voltage is a DC-motor driven by a H-bridge configuration.

17. The system of claim 16 wherein the circuitry to drive said H-bridge configuration comprises high voltage high side drivers, high voltage low-sided rivers, a charge pump providing high voltage and a circuitry to provide PWM and timing for said high side and low side drivers.

18. The system of claim 1 wherein said circuitry to manage feedback comprises an AMR sensor interface.

19. The system of claim 1 comprising a circuitry for detection of over/under-voltage and short-circuit conditions.

20. The system of claim 1 comprising a 2-port Kline connection to communicate with other chips or systems.

21. A system on a chip using CMOS technology to drive a DC-motor in a H-bridge configuration requiring high voltage support is comprising:
    a means of data processing;
    a means of memory, attached to said means of data processing;
    several output ports, attached to said means of data processing and to a means of power management;
    several input ports attached externally to an AMR sensor and attached internally to an AMR sensor interface;
    means of clock sources coupled to said means of data processing;

a core and peripheral bus coupled to said means of data processing, to a motor bridge controller, and to an AMR sensor controller;

said means of power management;

a motor bridge controller being coupled between said means of data processing and ports of the ASIC to be connected to high side and low-side transistors of the H-bridge comprising:
 a circuitry to generate PWM und timing pulses;
 high-side drivers providing high voltage; and
 low-side drivers providing high voltage;

an AMR sensor controller, being coupled to said means of data processing and to an AMR sensor comprising:
 an analog-to digital converter; and
 an angle measurement interface;

said AMR sensor attached to the DC-motor;

said DC-motor, driven by two high-side and two low-side transistors;

said two high-side transistors of the H-bridge, being connected to said high-side drivers of said motor bridge controller and to a means to prevent reverse supply;

said two low-side transistors of the H-bridge, being connected to said low-side drivers of said motor bridge controller; and said means of reverse supply protection being coupled between said high-side transistors and said means of power management.

22. The system of claim 21 wherein said means of data processing is a micro-controller.

23. The system of claim 21 wherein said high voltage has an upper range between 30 to 60 Volts.

24. The system of claim 21 wherein said means of memory comprises a RAM.

25. The system of claim 21 wherein said means of memory comprises a Program Flash memory.

26. The system of claim 21 wherein said means of memory comprises a Data Flash memory.

27. The system of claim 21 wherein said means of power management comprises one or more charge pumps.

28. The system of claim 21 wherein said output ports comprise ports having a regulated voltage.

29. The system of claim 21 wherein said output ports provide different voltage levels having an upper range between 30 to 60 Volts.

30. The system of claim 21 wherein said means of clock sources comprise an oscillator having an external crystal.

31. The system of claim 21 wherein said means of clock sources comprise an oscillator having an external ceramic resonator.

32. The system of claim 21 wherein said means of clock sources comprise an internal slow clock oscillator.

33. The system of claim 32 wherein said internal slow clock oscillator is a relaxation oscillator.

34. The system of claim 33 wherein said internal slow clock oscillator is a ring oscillator.

35. The system of claim 33 wherein said internal slow clock oscillator operates with 100 kHz.

36. The system of claim 21 wherein said system is comprising a temperature sensor.

37. The system of claim 21 comprising a circuitry for detection of over/under-voltage and short-circuit conditions.

38. The system of claim 21 comprising a 2-port Kline connection to communicate with other chips or systems.

39. The system of claim 21 wherein said H-bridge is driven by four power transistors.

40. The system of claim 21 wherein said power transistors are power FETs.

41. The system of claim 21 wherein said H-bridge is driven by four relays.

* * * * *